United States Patent [19]

Suda et al.

[11] Patent Number: 5,140,357
[45] Date of Patent: Aug. 18, 1992

[54] AUTOMATIC FOCUSING DEVICE WHEREIN LOOP GAIN IS SET RESPONSIVELY TO VARIATION OF MAGNIFICATION

[75] Inventors: Hirofumi Suda; Hideyuki Arai; Kitahiro Kaneda, all of Kanagawa, Japan

[73] Assignee: Canon Kabushiki Kaisha, Tokyo, Japan

[21] Appl. No.: 626,468

[22] Filed: Dec. 12, 1990

[30] Foreign Application Priority Data

Dec. 18, 1989 [JP] Japan .................. 1-329288

[51] Int. Cl.$^5$ .................. G03B 3/00; H04N 5/232
[52] U.S. Cl. .................. 354/40; 354/195.12; 358/227
[58] Field of Search .......... 354/400, 402, 404, 195.1, 354/195.12; 358/227

[56] References Cited

U.S. PATENT DOCUMENTS

4,920,420  4/1990  Sano et al. .................. 358/227

Primary Examiner—W. B. Perkey
Assistant Examiner—Cassandra C. Spyrou
Attorney, Agent, or Firm—Robin, Blecker, Daley & Driscoll

[57] ABSTRACT

An automatic focus adjusting device comprising extracting circuitry for extracting a focus signal from an image sensor corresponding to the degree of focusing of an image sensing signal output from the sensor, a drive device for adjusting focus so as to bring an optical system into a focuses state on the basis of the focus signal and a control unit operative to detect a magnification varying operation of the optical system for controlling a loop gain of a closed loop encompassing the image sensor, the extracting circuitry and the drive device.

20 Claims, 7 Drawing Sheets

AUTOMATIC FOCUSING DEVICE WHEREIN LOOP GAIN IS SET RESPONSIVELY TO VARIATION OF MAGNIFICATION

BACKGROUND OF THE INVENTION

1. Field of the Invention

This invention relates to automatic focus adjusting devices suited to be used in video cameras or other video apparatus.

2. Description of the Related Art

For the automatic focus detecting device for use in the video camera or the like, many types have been proposed. In general, using the video signal obtained from the image sensor, focus adjustment is carried out by moving the photographic lens so as to bring the high-frequency component extracted from the video signal to a maximum. This is known as the so-called hill climbing method. Such an automatic focus adjusting type obviates the necessity of the special optical members which would otherwise be used for focus adjustment in the apparatus of sending and receiving infrared light or supersonic waves to and from a target. In addition, it has a merit in that for any target, or object to be photographed, however far or near it may be, focusing can be controlled with high accuracy independently of its distance.

For application to the case of driving the lens merely to move in a direction to increase the level of the high-frequency component, because, at the time of start, the lens has to be preliminarily moved in either direction to see which direction, higher or lower, the level of the high-frequency component changes to, other-wise the focusing movement could not be discriminated between the directions to and from an in-focus point. It is also proposed that the focusing lens or the image sensor is made to always minutely wobble back and forth and the resulting change of the level of the high-frequency component is used to get information representing the near-focus or far-focus state.

Figure 1:
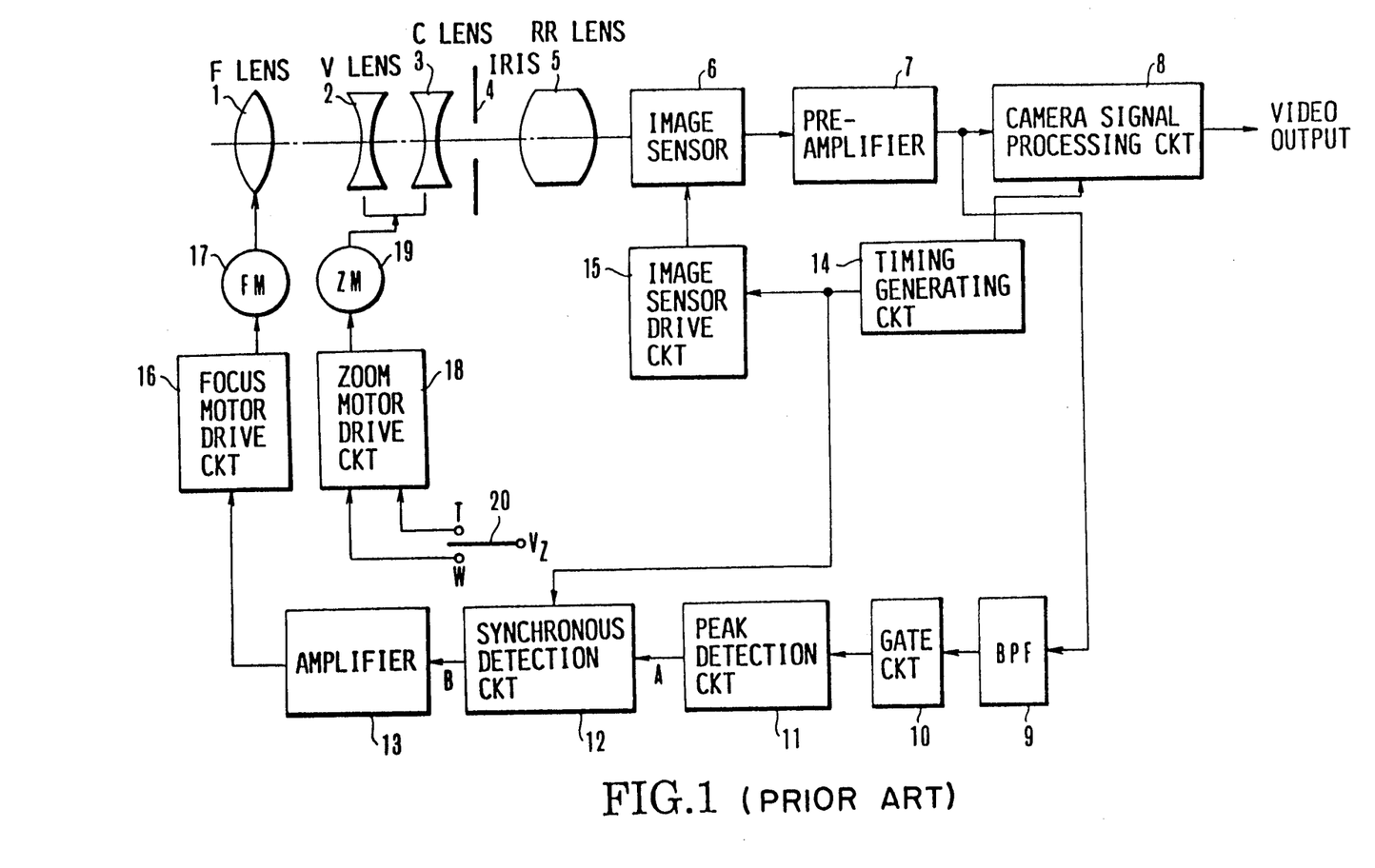
FIG. 1 is a block diagram illustrating the construction of the automatic focus adjusting device not employing the present invention.

An automatic focus adjusting device of this kind is described using FIG. 1.

In FIG. 1, the automatic focus adjusting device comprises a first lens group 1 for focus adjustment (hereinafter called the "F lens"), a second lens group 2 for varying the focal length (hereinafter called the "V lens"), a third lens group 3 for performing compensation to keep constant the position of an image plane against zooming (hereinafter called the "C lens"), an iris 4 and a fourth lens group 5 for forming an image of an object right on an image sensing plane (hereinafter called the "RR lens"). Light passing through these lens groups is focused on the image sensing plane of an image sensor 6, where it is photoelectrically converted into an electrical signal and is output as the video signal. The image sensor 6 is arranged to be wobbled very short distances axially in predetermined periods by a drive circuit 15 whose operation is controlled in conformance with timing signals from a timing generating circuit 14. By this, the image sensing plane periodically vibrates back and forth. Responsive to this vibration, the image changes its focus state, which serves as a modulating signal to modulate the image sensing signal. The video signal output from the image sensor 6 is amplified to a predetermined level in passing through a pre-amplifier 7 and therefrom supplied to a camera signal processing circuit 8, where it is converted into a standard television signal by gamma correction, blanking, addition of a synchronizing signal, and other processing, and also to a band pass-filter (BPF) 9. In the BPF 9, a component of the video signal which varies with variation of the focus state, i.e., the high-frequency component, is extracted. A gate circuit 10 then extracts that portion of the input signal which corresponds to a focus detecting area set in a part of the area of a picture plane. A peak detection circuit 11 then detects a peak value of the extracted signal in a field or frame period. This peak value is then processed in a synchronous detection circuit 12 according to the output signal of the timing generating circuit 14. The output signal of the synchronous detection circuit 12 is supplied to an amplifier 13, where the loop gain is set to a particular value, and is therefrom supplied to a focus motor drive circuit 16. As a focus motor 17 is energized by the drive circuit 16, the F lens 1 is moved to adjust the focus.

Figures 2A, 2B:
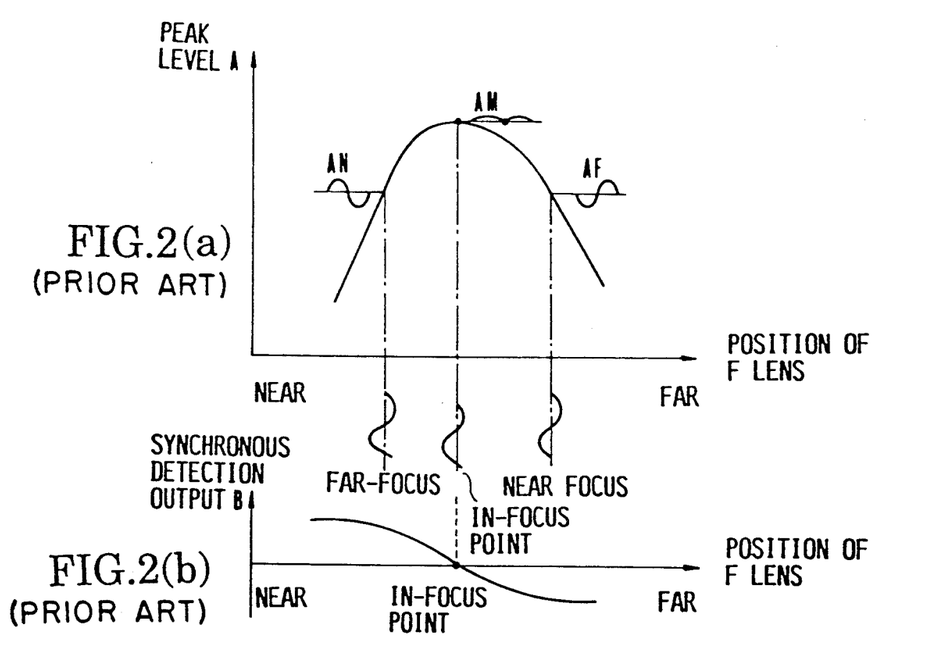
FIGS. 2(a) and 2(b) are graphs for explaining the operation of the device of FIG. 1.

Next, using FIGS. 2(a) and 2(b), the principle of automatic focus detection is explained. FIGS. 2(a) and 2(b) show respectively the variations of the output A of the peak detection circuit 11 and the output B of the synchronous detection circuit 12 with movement of the lens from the in-focus point to either of far and near points. The output A has a mountain-like characteristic curve which takes a maximum at the in-focus point and decreasing values as focusing goes to the far or near side. Because the image sensor 6, however, wobbles back and forth on the optical axis, as has been described, this is responded by adding either one of signals AN and AF of opposite phases on the near and far sides of the in-focus point, or a signal AM whose amplitude is a minimum at the in-focus point. To take this out, therefore, the same frequency as that of the wobbling is used in the synchronous detection. Thus, a signal that is of opposite signs for the near and far focus states and has a value of zero in sharp focus can be obtained at the output B, as shown in FIG. 2(b). This signal is appropriately amplified by the amplifier 13 and supplied to the motor drive circuit 16. In such a manner, discrimination between the near focus and the far focus is made to determine the direction in which the lens is to move to bring the image into sharp focus. After this, the lens can be moved at a speed corresponding to the detection output.

Figure 3A:
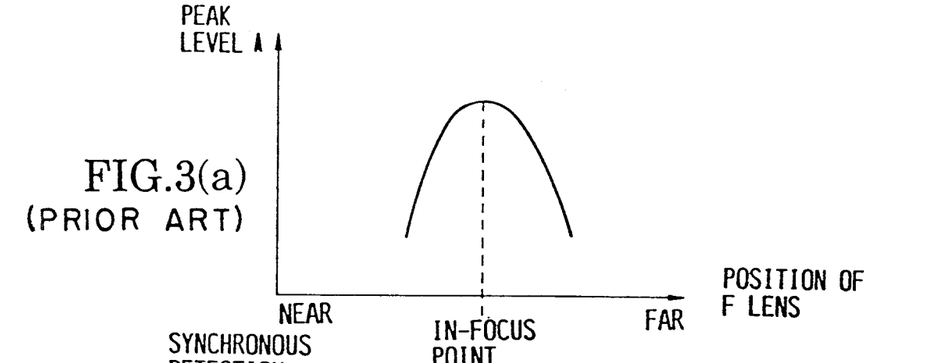
FIGS. 3(a), 3(b), 3(c) and 3(d) are graphs for explaining the operation of the device of FIG. 1.
Figure 3B:
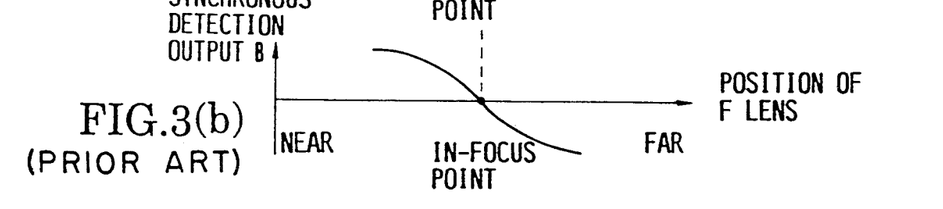
Figure 3C:
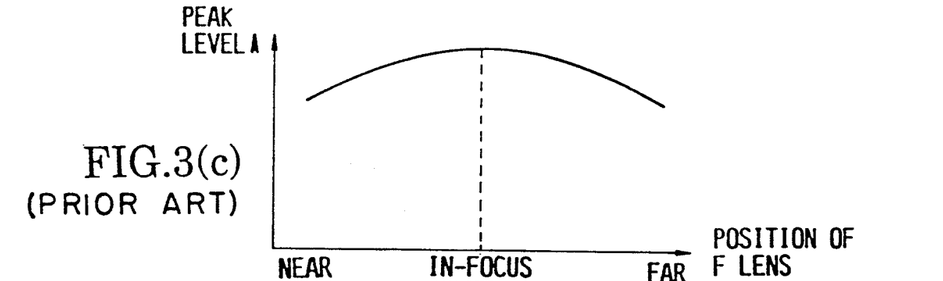
Figure 3D:
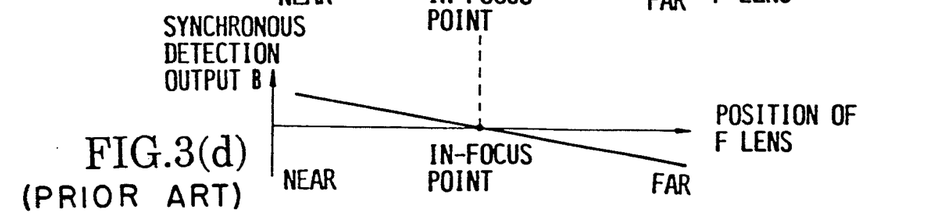

In a case where the present system employs the zoom lens, the degree of sensitivity of the image plane to the movement of the F lens varies depending on the focal length and the aperture size, i.e., the depth of field. In more detail, under the condition that the focal length is long (as in the telephoto positions), or the iris is at or near the full open aperture with which the depth of field is shallow, the output A changes like a steep mountain as shown in FIG. 3(a). So, the synchronous detection output B gives a clear in-focus point as shown in FIG. 3(b). Hence, the accuracy of stopping control takes a high absolute value. On the contrary, when the focal length is short (as in the wide-angle positions) and the iris is stopped down to deepen the depth of field, the output A is flattened like a gently sloping hill as shown in FIG. 3(c). So, the synchronous detection output B has a small level difference over the entire focusing range as shown in FIG. 3(d), giving unclear information for the in-focus point. Hence, in this condition, the absolute stop accuracy is lowered.

Therefore, the system of the character described above has the following drawback. Suppose, after the automatic focus adjustment has been done in the wide-angle position, the photographer turns a zoom actuator or switch 20 to the other position where another control voltage Vz is applied to a zoom motor drive circuit 18 so that a zoom motor 19 moves the V and C lenses to the telephoto end, then it becomes necessary to correct the stopped position for the in-focus state of the F lens in the middle of the course of zooming. If this correction is slow, the image is caused to blur transiently. This occurs likewise even when the zooming operation is carried out by hand.

In other words, when zooming from the telephoto side to the wide-angle side, the lens driving is in a direction to increase the depth of field. Therefore, it hardly happens that the image blurs. When zooming from the wide-angle side to the telephoto side, on the other hand, the depth of field decreases. A deviation of the plane of sharp image from the image sensing plane which could not be recognized in the wide-angle positions comes to appear as zooming approaches the telephoto end.

SUMMARY OF THE INVENTION

The present invention has been made to solve the above-described problem, and its first object is to provide a focus adjusting device which can stably and speedily adjust the focus regardless of any operative state of the video camera, etc., employing the same.

A second object of the invention is to provide an automatic focus adjusting device which assures prevention of the image from blurring even when zooming is in progress.

A third object of the invention is to provide an automatic focus adjusting device which, in application to the video camera in which the in-focus position varies with zooming, is able to quickly correct the in-focus position.

A fourth object of the invention is to provide an automatic focus adjusting device which is able to perform the automatic focus adjusting operation at a high speed.

To achieve such objects, according to the invention, in a preferred embodiment thereof, an automatic focus adjusting device is disclosed, comprising extracting means for extracting a focus signal corresponding to the degree of focusing from a video signal output from image sensing means, drive means for adjusting focus so as to bring an optical system to an in-focus state on the basis of the focus signal, and control means, responsive to variation of the focal length of the optical system, for controlling a loop gain of a closed loop composed of the image sensing means, the extracting means and the drive means.

A fifth object of the invention is to provide an automatic focus adjusting device of the type having means for modulating the image sensing signal by varying the position of an image sensing plane in a predetermined period, which device makes it possible to carry out the automatic focus adjusting operation which concurs with zooming at a high speed and with a high reliability by controlling the modulating means.

To achieve such an object, according to the invention, in another preferred embodiment thereof, an automatic focus adjusting device is disclosed, comprising modulating means for periodically varying an image forming state of an image sensing plane, extracting means for extracting, from an image sensing signal output from image sensing means, a signal responding to the modulating means and corresponding to the degree of focusing, drive means for moving an optical system to an in-focus point on the basis of the signal extracted by the extracting means, and control means, responsive to detection of an operation of varying the focal length of the optical system, for controlling a loop gain of a closed loop composed of the image sensing means, the extracting means and the drive means.

A sixth object of the invention is to provide an automatic focus adjusting means which, when detecting occurrence of a zooming operation, for example, from the wide-angle side to the telephoto side, increases the loop gain by a specified value during the zooming operation, thereby speeding up the automatic focus adjusting operation so as to suffice for correcting the stopped position. Thus, transient blurring is prevented from occurring.

A seventh object of the invention is to provide an automatic focus adjusting device which operates at so fast a speed as to prevent the image from blurring and assures maintenance of the image in an excellent quality during zooming. For this purpose, the zooming operation is examined and the loop gain of a control system for the focusing lens is controlled in order to rapidly compensate for the focusing error resulting from the zooming operation. For example, upon detection of a change of zooming to the direction from the wide angle side to the telephoto side, the gain of the closed loop is increased to thereby make it possible to prevent transient blurring from occurring during zooming, which would otherwise result from the delay of correction of the stopped position for sharpest image of the focusing lens.

Other objects and features of the invention will become apparent from the following description and drawings.

DETAILED DESCRIPTION OF THE PREFERRED EMBODIMENTS

The automatic focus adjusting device in the present invention is next described in detail in connection with its embodiments, while referring to the drawings.

Figure 4:
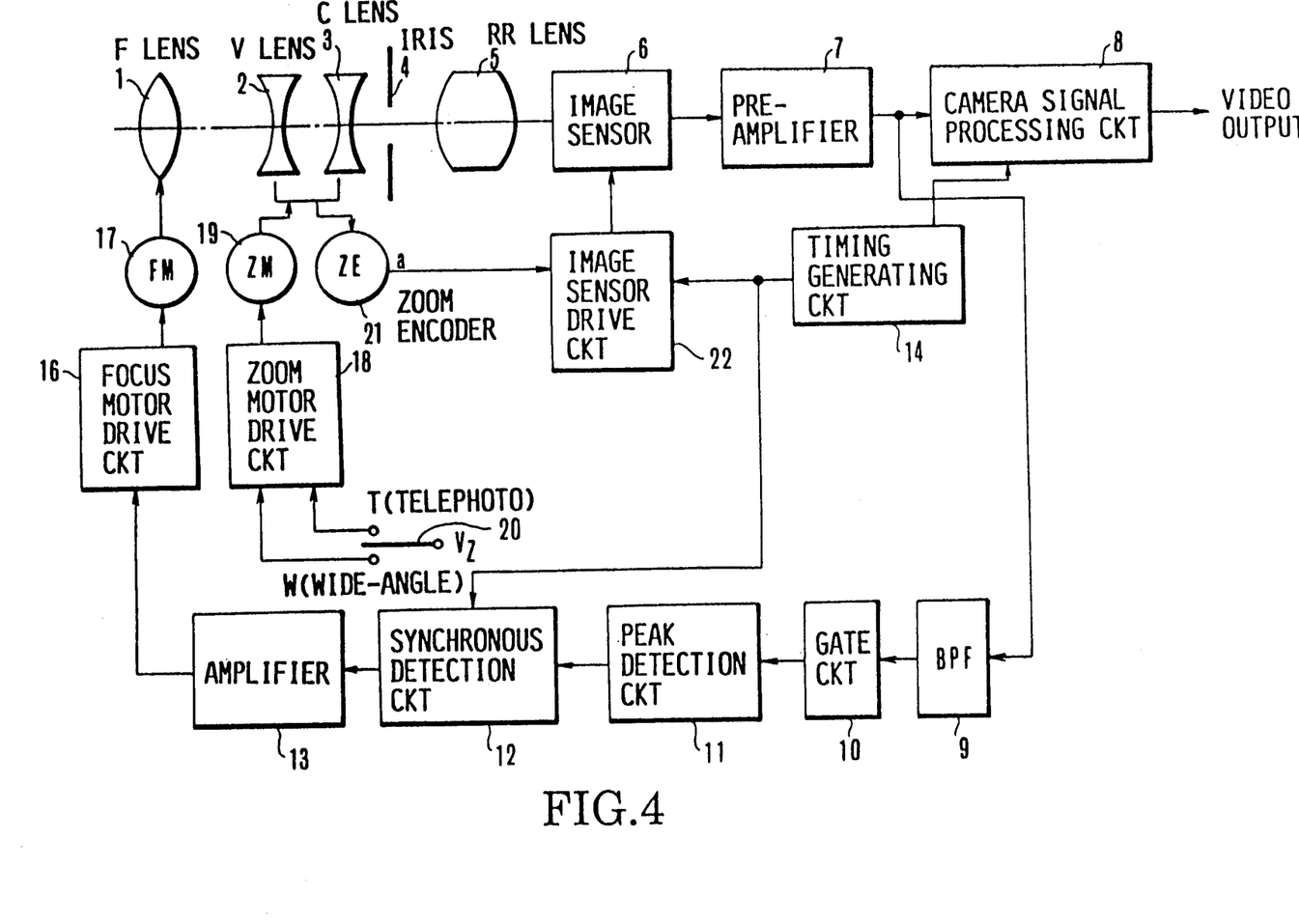
FIG. 4 is a block diagram of the construction of a first embodiment of an automatic focus adjusting device according to the invention.

FIG. 4 shows a first embodiment of the invention, where the same constituent parts as those of FIG. 1 are denoted by the same numerals and their explanation is omitted.

In the same figure, a zoom encoder 21 detects the zooming speed "a" when the V lens 2 and the C lens 3 are zoomed from the wide-angle side to the telephoto side. This zooming speed information output "a" is supplied to an image sensor drive circuit 22 for wobbling an image sensor 6 from the near-focus side to the far-focus side and vice versa to modulate the optical path. The image sensor drive circuit 22 has an ability to vary the drive gain when it wobbles the image sensor 6 in axial directions. As a result of this, the amplitude of modulation of the image sensing signal output from the image sensor 6 can be varied. In the image sensor drive circuit 22, by a predetermined value proportional to the zooming speed "a", the amount of wobbling of the image sensor 6, i.e., the amplitude of vibration, is increased, which in turn increases the amplitude of the optical path modulating component of the image sensing signal output from the image sensor 6. As a result, the loop gain of a closed loop of the focus control system composed of the image sensor 6, the signal processing system of the BPF 9 for taking the signal component caused by the optical path modulation out of the image sensing signal through the synchronous detection circuit 12, and the amplifier 13, the focus motor drive circuit 16 and the focus motor 17, is increased. By this, the detection sensitivity to the defocus amount increases so that the output level of the synchronous detection circuit 12 increases, causing the focus motor to be driven at a higher speed than usual. It becomes possible to correct the position of the F lens 1 at a high speed depending on the speed of zooming from the wide-angle side to the telephoto side and, therefore, to prevent blurring from occurring during zooming.

Figure 5:
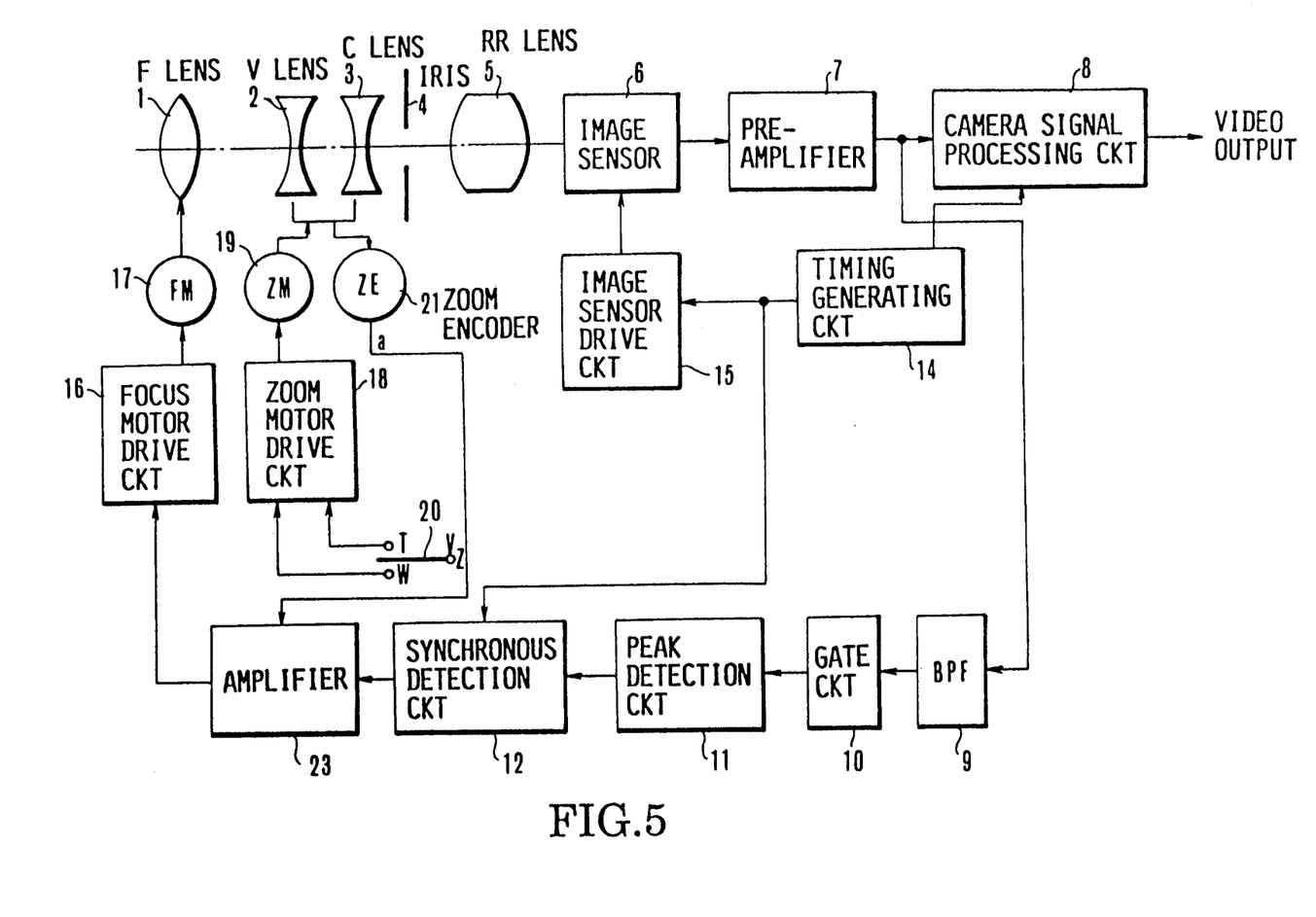
FIG. 5 is a block diagram of the construction of a second embodiment of the automatic focus adjusting device according to the invention.

FIG. 5 in block diagram shows the construction of a second embodiment of the invention, where the same constituent parts as those of FIG. 1 and FIG. 4 are denoted by the same numerals and their explanation is omitted.

According to the present embodiment, the amplifier 13 amplifies the output of the synchronous detection circuit 12 to control the focus motor drive circuit 16 is constructed so that its gain is variable. By supplying the detection output "a" of the zoom encoder 21 to the amplifier 13, the amplifier gain is increased, causing the closed loop gain of the whole focus motor drive system to increase.

In other words, the amplifier 13, when the fact that a zooming operation from the wide-angle side to the telephoto side is being performed is detected by the output "a" of the zoom encoder 21, increases its gain to control the focus motor drive circuit 16 in such a manner as to drive the focus motor 17 at a higher speed. By this, without occurrence of blurring during zooming, zooming can be performed smoothly and quickly.

Figure 6:
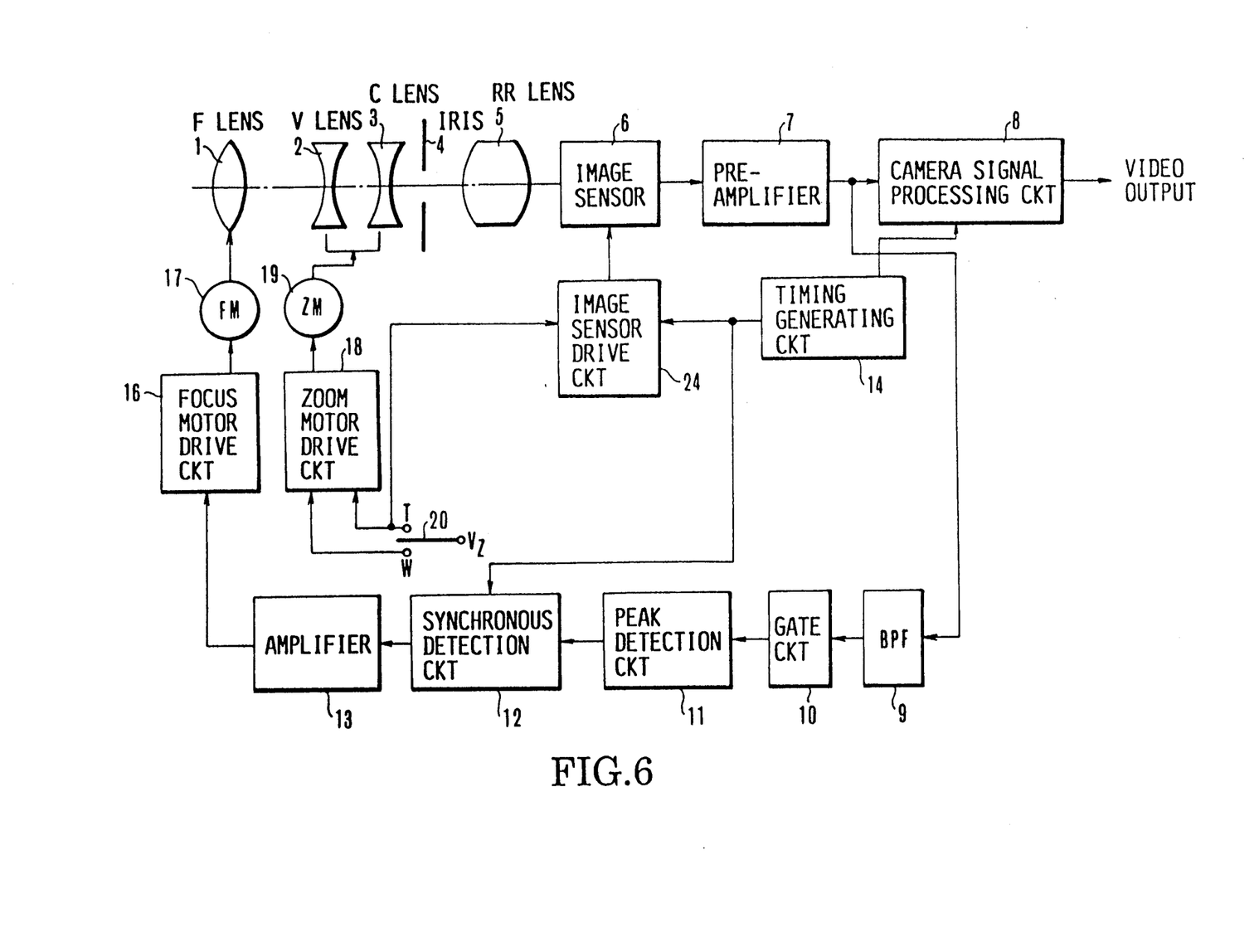
FIG. 6 is a block diagram of the construction of a third embodiment of the automatic focus adjusting device according to the invention.

FIG. 6 in block diagram shows the construction of a third embodiment of the invention. While, in FIG. 4, the zoom encoder 21 is used to detect the zooming operation, the present embodiment is to detect that the zooming operation has been done by means of a zoom switch 20. Concretely speaking, the zoom switch 20 has a contact for telephoto side thereof connected to the image sensor drive circuit 24 and is arranged so that during the zooming, by changing over the switch 20, the control voltage Vz to be applied to the zoom motor drive circuit 18 is, when the zoom switch 20 is changed over to the telephoto side, supplied to the image sensor drive circuit 24. In the image sensor drive circuit 24, when the control voltage Vz representing that the zoom switch 20 has been changed over to the telephoto side is input, the amount of wobbling of the image sensor is increased, likewise as in the first embodiment of FIG. 4, to increase the closed loop gain of the focusing control system. Thus, focus adjustment is carried out at a high speed. By this, occurrence of blurring during the zooming can be prevented.

Figure 7:
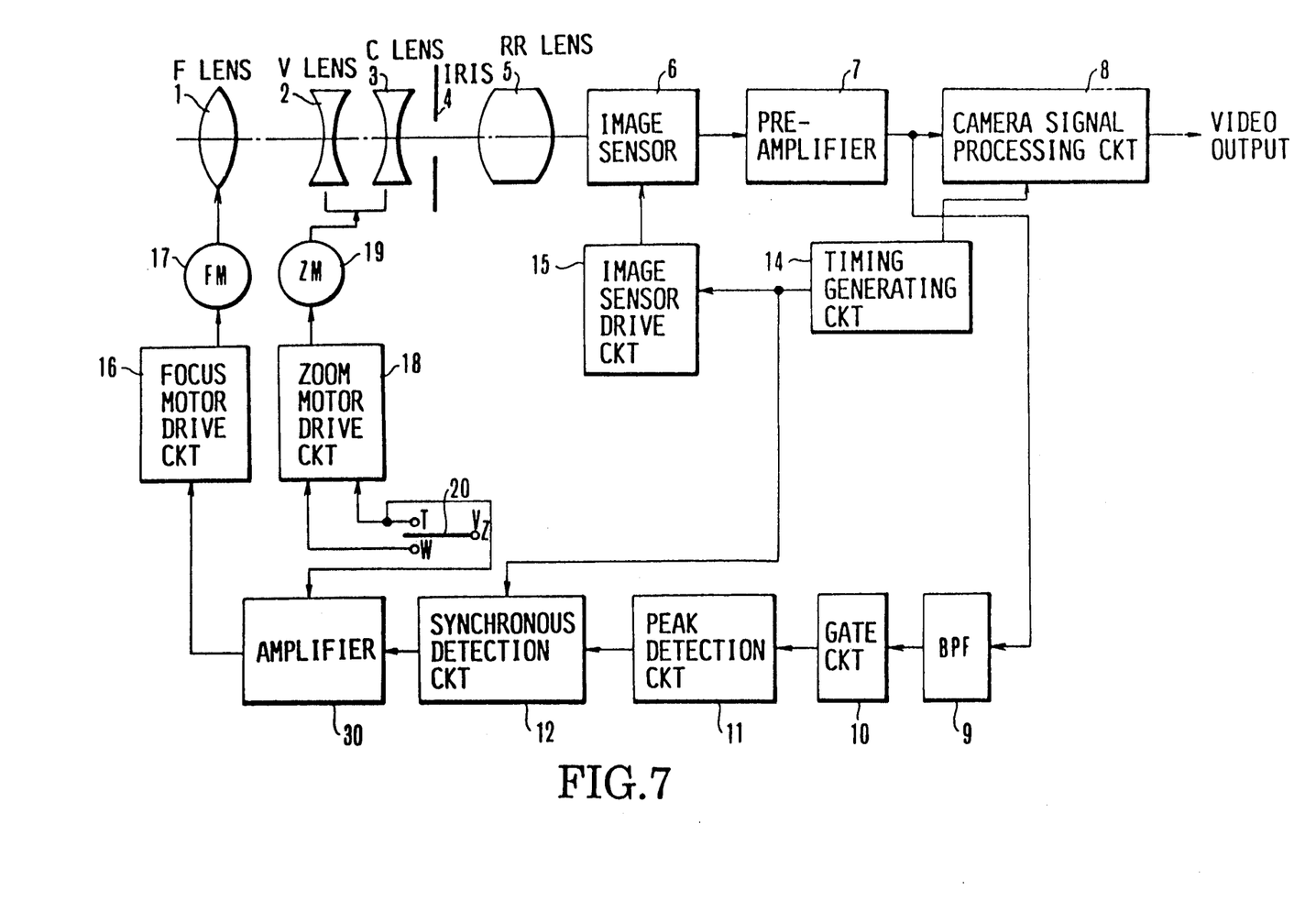
FIG. 7 is a block diagram of the construction of a fourth embodiment of the automatic focus adjusting device according to the invention.

FIG. 7 in block diagram shows the construction of a fourth embodiment of the invention. When the switch 20 is changed over to the telephoto side to carry out a zooming operation from the wide-angle side to the telephoto side, the gain of an amplifier 30 is increased in response to the switch 20, so that the closed loop gain of the entirety is increased. The subsequent operation is similar to that of the embodiment of FIG. 5.

The automatic focus adjusting device of the invention has so far been described in connection with each of the first to fourth embodiments. In the third and fourth embodiments, it is also possible that instead of the switch 20, a variable resistor is used for variable speed zooming, thereby setting the closed loop gain to a value corresponding to the zooming speed. Also, instead of varying the amount of wobbling of the image sensor and the gain of the amplifier, the filter characteristic of the BPF 9 is made to vary. Even in this case, it is possible to vary the closed loop gain of the entirety.

It should be noted that though in the foregoing embodiments an example of focusing by moving the F lens has been shown, the invention is applicable to another types of automatic focus adjustment where the F lens is fixed and the C lens or the RR lens is made to move to effect focusing. And, since, in such types of lenses, the in-focus position varies with a complicated function of the focal length of the entire system, this must simultaneously be compensated for in response to the position of the V lens. Therefore, not only for zooming from the wide-angle side to the telephoto side, but also for zooming from the telephoto side to the wide-angle side, it is advantageous in increasing the closed loop gain even during the zooming operation from the telephoto side to the wide-angle side.

It should also be noted that, though, in the foregoing embodiments, the method of wobbling the image sensor in the axial directions has been employed for modulating the image sensing signal, the invention is not confined to this. The focusing lens may otherwise be made to wobble.

As has been described above, according to the automatic focus adjusting device in the present invention, the zooming operation is detected to control the loop gain of the control system for the focusing lens, thereby making it possible to quickly correct the focusing error resulting from the zooming operation. In view of the embodiments, on detection of the fact that zooming is being performed from the wise-angle side to the telephoto side, the closed loop gain of the entirety is increased, thereby making it possible to prevent transient blurring from occurring during the zooming, which would otherwise result when the correction of the stopped position for in-focus of the focusing lens is delayed. Thus, an automatic focus adjusting device which assures high speed focusing without causing the image to blur and maintenance of the image at an excellent quality throughout.

What is claimed is:

1. An automatic focus adjusting device comprising:
 (a) extracting means for extracting a focus signal corresponding to the degree of focusing from an image sensing signal output from the image sensing means;

(b) drive means for adjusting focus so as to bring an optical system into an in-focus state on the basis of said focus signal; and (c) control means, arranged to detect a magnification varying operation of said optical system, for controlling a loop gain of a closed loop composed of said image sensing means, said extracting means and said drive means in response to the detection of the magnification varying operation.

2. A device according to claim 1, wherein said extracting means extracts a high-frequency component from said image sensing signal.

3. A device according to claim 1, wherein said control means varies the loop gain to control a driving characteristic of said drive means for driving said optical system.

4. A device according to claim 3, wherein said control means, when the magnification varying operation is carried out from a wide-angle side to a telephoto side, increases the loop gain.

5. A device according to claim 3, wherein said control means, when the magnification varying operation is carried out from a wide-angle side to a telephoto side, increases a driving speed of said drive means.

6. A device according to claim 1, wherein said magnification varying operation is detected by a zoom encoder.

7. A device according to claim 1, wherein said magnification varying operation is detected by an operation of a zooming operation switch.

8. An automatic focus adjusting device comprising:
(a) modulating means for periodically varying an image forming state of an image sensing plane;
(b) extracting means for extracting a signal responding to said modulating means and corresponding to the degree of focusing from an image sensing signal output from image sensing means;
(e) drive means for moving an optical system to an in-focus point on the basis of the signal extracted by said extracting means; and
(d) control means, arranged to detect a magnification varying operation of said optical system, for controlling a loop gain of a closed loop composed of said image sensing means, said extracting means and said drive means in response to the detection of the magnification varying operation.

9. A device according to claim 8, wherein said modulating means vibrates said image sensing means or a focusing lens back and forth in axial directions in a predetermined period to modulate said image sensing signal.

10. A device according to claim 8, wherein said extracting means extracts a high-frequency component which has been modulated from said image sensing signal, and extracts an amount of variation of the high-frequency component which has been modulated.

11. A device according to claim 10, wherein said extracting means extracts said high-frequency component from a portion of the image sensing signal which is obtained from a focus detecting area formed in a predetermined position on the image sensing plane.

12. A device according to claim 8, wherein said control means varies an amplitude of vibration of said modulating means in accordance with the magnification varying operation.

13. A device according to claim 8, wherein said control means, when the magnification varying operation is carried out from a wide-angle side to a telephoto side, increases the loop gain.

14. A device according to claim 8, wherein said control means, when the magnification varying operation is carried out from a wide-angle side to a telephoto side, increases a driving speed of said drive means.

15. A device according to claim 12, wherein said control means detects said magnification varying operation from a zoom encoder.

16. A device according to claim 12, wherein said control means detects said magnification varying operation by an operation of a zooming operation switch.

17. An automatic focus adjusting device comprising:
(a) extracting means for extracting a focus signal corresponding to the degree of focusing from an image sensing signal output from image sensing means;
(b) modulating means for modulating said focus signal by a predetermined frequency;
(c) drive means for moving a focusing lens to an in-focus point on the basis of a signal obtained by demodulating a modulation component of said focus signal modulated by said modulating means; and
(d) control means, arranged to detect a magnification varying operation being carried out from a wide-angle side to a telephoto side, for varying a drive characteristic of said focusing lens in response to the detection of the magnification varying operation.

18. A device according to claim 17, wherein said control means increases the responsiveness of said focusing lens.

19. A device according to claim 17, wherein said magnification varying operation is detected by an operation of a zooming operation switch or a zoom encoder, and wherein said control means increases he amount of modulation of said modulating means.

20. A device according to claim 17, wherein said magnification varying operation is detected by an operation of a zooming operation switch or a zoom encoder, and wherein said control means increases a drive gain of said focusing lens.

* * * * *